US009307598B2

(12) United States Patent
Maa et al.

(10) Patent No.: US 9,307,598 B2
(45) Date of Patent: Apr. 5, 2016

(54) LED LIGHTING DEVICE WITH REPLACEABLE DRIVER-CONTROL MODULE

(71) Applicant: Lightel Technologies, Inc., Renton, WA (US)

(72) Inventors: Chia-Yiu Maa, Bellevue, WA (US); Ching-Feng Lin, Taipei (TW); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 0 days.

(21) Appl. No.: 14/660,902

(22) Filed: Mar. 17, 2015

(65) Prior Publication Data

US 2015/0223301 A1    Aug. 6, 2015

Related U.S. Application Data

(63) Continuation-in-part of application No. 14/146,535, filed on Jan. 2, 2014, now abandoned.

(51) Int. Cl.
*H05B 33/08* (2006.01)
*H05B 37/02* (2006.01)
*F21V 23/00* (2015.01)
(Continued)

(52) U.S. Cl.
CPC .......... *H05B 33/0842* (2013.01); *F21V 23/006* (2013.01); *F21V 23/0435* (2013.01); *F21V 23/0442* (2013.01); *F21V 23/0464* (2013.01); *F21V 23/0471* (2013.01); *F21V 23/06* (2013.01); *H05B 33/00* (2013.01); *H05B 33/0809* (2013.01); *H05B 37/0218* (2013.01); *H05B 37/0227* (2013.01); *H05B 37/0236* (2013.01); *F21K 9/175* (2013.01);
(Continued)

(58) Field of Classification Search
CPC .................... F21Y 2103/003; F21Y 2103/022; F21Y 2113/00; F21Y 2101/02; F21K 9/175; F21K 9/30; F21K 9/17; F21S 8/04; F21S 2/00; F21S 4/008; F21V 19/0095; F21V 23/006; F21V 23/0435; F21V 23/0442; F21V 23/0464; F21V 23/0471; F21V 23/06; F21V 29/70; F21V 15/015; H05B 33/00; H05B 33/0842; H05B 37/0227; H05B 37/0236; H05B 37/0218; H05B 33/0809
See application file for complete search history.

(56) References Cited

U.S. PATENT DOCUMENTS

2014/0210372 A1* 7/2014 Chang ................ H05B 33/0827
315/294
2014/0328066 A1* 11/2014 Barnetson ................ F21K 9/10
362/294

(Continued)

*Primary Examiner* — Vibol Tan
(74) *Attorney, Agent, or Firm* — Han IP Corporation

(57) ABSTRACT

An LED lighting device with a replaceable driver-control module interface is described. The LED lighting device may include a driver-less LED lighting device, a driver-control module with driver function, and a housing interface on the driver-less LED lighting device to house and connect the driver-control module. The driver-less LED lighting device receives AC from an external AC source and passes the AC to the driver-control module. The driver-control module receives AC from the driver-less LED lighting device and provides DC to the driver-less lighting device to drive LED diodes in the driver-less LED lighting device. The housing interface on the lighting device houses the driver-control module such that, when the driver-control module is fastened to the driver-less lighting device through the housing interface, the driver-control becomes an integral part of the lighting device.

12 Claims, 12 Drawing Sheets

(51) Int. Cl.
  *F21V 23/04* (2006.01)
  *F21V 23/06* (2006.01)
  *H05B 33/00* (2006.01)
  *F21V 29/70* (2015.01)
  *F21K 99/00* (2010.01)
  *F21V 15/015* (2006.01)
  *F21Y 101/02* (2006.01)

(52) U.S. Cl.
  CPC .............. *F21V 15/015* (2013.01); *F21V 29/70* (2015.01); *F21Y 2101/02* (2013.01)

(56) References Cited

U.S. PATENT DOCUMENTS

| | | | |
|---|---|---|---|
| 2014/0340884 A1* | 11/2014 | Hsia | F21V 23/009 362/221 |
| 2015/0084503 A1* | 3/2015 | Liu | F21V 23/06 315/51 |
| 2015/0108900 A1* | 4/2015 | Maa | H05B 33/0845 315/149 |

\* cited by examiner

LED LIGHTING DEVICE WITH REPLACEABLE DRIVER-CONTROL MODULE

CROSS REFERENCE TO RELATED PATENT APPLICATION

The present disclosure is a continuation-in-part (CIP) application of U.S. patent application Ser. No. 14/146,535, filed on Jan. 2, 2014, which claims the priority benefit of Chinese Patent Application No. 201310440236.2, filed on Sep. 25, 2013 with the State Intellectual Property Office of China.

TECHNICAL FIELD

The present disclosure relates to the field of luminaires and, more particularly, to a pluggable control module for light-emitting diode (LED) lighting device.

BACKGROUND

The lifetime of a traditional fluorescent tube is around 5000 hours and the ballast used to energize the tube has a lifetime of around 20,000 to 30,000 hours, as compared the lifetime of a lighting fixture which is over 100,000 hours. Due to the limitation posed by the shorter lifetime of fluorescent tubes, the design goal of linear lighting fixtures has been to use a standardized connection interface, such as the G13 socket, that facilitates the installation and uninstallation of the fluorescent tube into and out of the fixture, with all installation able to be safely performed by any consumer without any tools. Also, since the lifetime of the ballast is longer than that of the fluorescent tube, the ballast is normally screwed onto the fixture and must be changed by a qualified electrician, as ballast replacement involves re-wiring the power line.

The relatively recent appearance of the LED tube on the market as a replacement for the fluorescent tube has challenged the validity of the original design principal for linear fixtures. This is due to the fact that an LED tube has a potential lifetime exceeding 100,000 hours, and therefore does not require replacement within the lifetime of the linear fixture. As such, there is no longer the need for easy and frequent tube replacement, and thus the use of the standard G13 based socket interface becomes meaningless. Moreover, although the majority of LED tubes on the market still support the G13 based socket as a direct replacement for G13 based fluorescent tubes, the new linear LED luminaire, which consists of both the linear fixture and LED tube, does not require the G13 socket interface.

At the same time, while an LED chip has a potential lifetime of over 100,000 hours, the average lifetime of an LED driver is around 20,000 to 30,000 hours, which limits the overall lifetime of the LED lamp. The same lifetime limitation exists in the electronic components used in the LED light control module. This limitation gives rise to a new problem unique to the LED luminaire; namely, the LED light source or lamp has a significantly longer lifetime than the driver and the control module. Thus, the new design need of LED fixtures is the easy replacement of the driver or control module, rather than the LED tube or light source. Presently, all of the linear fixtures on the market hide the driver, the ballast, or the control module inside the fixture, making them difficult to access. As a result, any part replacement requires a qualified electrician. The traditional linear fixture design is clearly outdated with respect to the LED light source and driver.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

In one aspect, a LED lighting device with a replaceable driver-control module interface may include a driver-less LED lighting device, a driver-control module with driver function, and a housing interface on the driver-less LED lighting device to house and connect the driver-control module. The driver-less lighting device may receive AC from an external AC source and passes the AC to the driver-control module. The driver-control module may receive AC from the driver-less lighting device and may provide DC to the driver-less lighting device to drive the LED diodes in the driver-less lighting device. The housing interface on the lighting device firstly may house the driver-control module such that when the driver-control module is fastened to the driver-less lighting device through the housing interface, the driver-control becomes an integral part of the lighting device; secondly it may provide electrical contacts for the driver-control module to receive AC from the driver-less lighting device and for the driver-less lighting device to receive DC from the control-driver module; and thirdly it may provide a mechanical mechanism to fasten the driver-control module onto the driver-less lighting device. The driver-control module may include a main body, an AC-to-DC driver, and the AC-in and the DC-out ports.

In some embodiments, the AC-in port and the DC-out port on the driver-control module may be hole-shaped sockets. The matching ports on the driver-less LED lighting device may be cylindrical pins. The cylindrical pins may be inserted into the hole-shaped sockets. In some embodiments, the hole-shaped sockets and the cylindrical pins may be aligned in a row.

In some embodiments, the AC-in port and the DC-out port on the driver-control module may be metal plates. The matching ports on the driver-less LED lighting device may be elastic metal plates. The metal plates and the elastic metal plates may be connected when the driver-control module is fastened onto the driver-less lighting device. In some embodiments, the driver-control module may further include a locking mechanism configured to fasten driver-control module unto the driver-less lighting device without using any external fastening forces such as screw.

In some embodiments, the driver-control module may further include a control circuitry disposed between the AC-in port and the input of the AC-to-DC converter, such that the driver-control module may be configured to receive control signals that include at least an on-off signal, a dimming signal, and a color tuning signal.

Alternatively, the control circuitry may be configured to receive the control signals through infra-red signals, WiFi signals, Bluetooth signals, power-line-transmitted signals, a control signal line, or a combination thereof. Additionally, the control circuitry may include an Internet network interface configured to receive control signals according to one or more IP protocols.

In some embodiments, the control circuitry may further include a motion sensor disposed between the AC-in port and the input of the AC-to-DC converter, and configured to activate the DC-out port responsive to detection of a motion.

In some embodiments, the control circuitry may further include a sound sensor disposed between the AC-in port and the input of the AC-to-DC converter, and configured to activate the DC-out port responsive to detection of a sound.

In some embodiments, the control circuitry may further include a dimmer circuit disposed between the AC-in port and the input of the AC-to-DC converter, and configured to adjust the DC-out level according to a dimming signal.

In some embodiments, the control circuitry may further include an ambient light sensor disposed between the AC-in port and the input of the AC-to-DC converter, and configured to control the DC-out level automatically according to an ambient light level.

The claims and advantages will be more readily appreciated as the inventive concept becomes better understood by reference to the following detailed description and the accompanying drawings showing exemplary embodiments, in which like reference symbols designate like parts. For clarity, various parts of the embodiments in the drawings are not drawn to scale.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Various implementations of the present invention and related inventive concepts are described below. It should be acknowledged, however, that the present invention is not limited to any particular manner of implementation, and that the various embodiments discussed explicitly herein are primarily for purposes of illustration. For example, the various concepts discussed herein may be suitably implemented in a variety of LED lighting devices having different form factors.

The present invention discloses a LED lighting device with replaceable driver-control module that eliminates the limitations of the traditional linear fixture and supports replacement of the driver-control module to be performed by any end user, thus eliminating the need for an electrician.

Additionally, a new driver-control module could add new functionality to the LED luminaire. For example, the old driver-control module may not have dimming capability. By replacing the old driver-control module with a new driver-control module with dimming capability, the LED luminaire would become dimmable without any modification to the rest of the LED luminaire. Similarly, a new driver-control module with an ambient light sensor would allow for automatic light adjustment of the LED lighting device without any modification to the rest of the LED luminaire.

Separately, a new driver-control module may be used to upgrade existing functionality. For example, an older driver-control module with a motion sensor that only has a detection range of 2 meters could be upgraded to a new driver-control module with a better motion sensor that increases the detection range to 10 meters. In the same way, an older driver-control module that uses an infra-red remote control that is limited to distances of up to 5 meters and cannot penetrate through a solid object may be replaced with a new driver-control module using WiFi remote control that is effective over distances of up to 20 meters and can penetrate solid objects. Another example would be to use a new driver-control module with a high-performance driver to achieve higher energy efficiency. An end user would be able to enjoy these upgrade functionalities without making any modification to the rest of the LED luminaire.

Different driver-control modules would also allow for product differentiation. For examples, an IR-based driver-control module would be available for users or areas that require IR remote control, while a WiFi-based driver-control module would be available for users or areas that require WiFi-based remote control. In both cases, the rest of the LED luminaire would be kept exactly the same, reducing production and inventory costs while offering end users more choices and an LED luminaire with increased functionality.

Example Implementations

Figure 1:
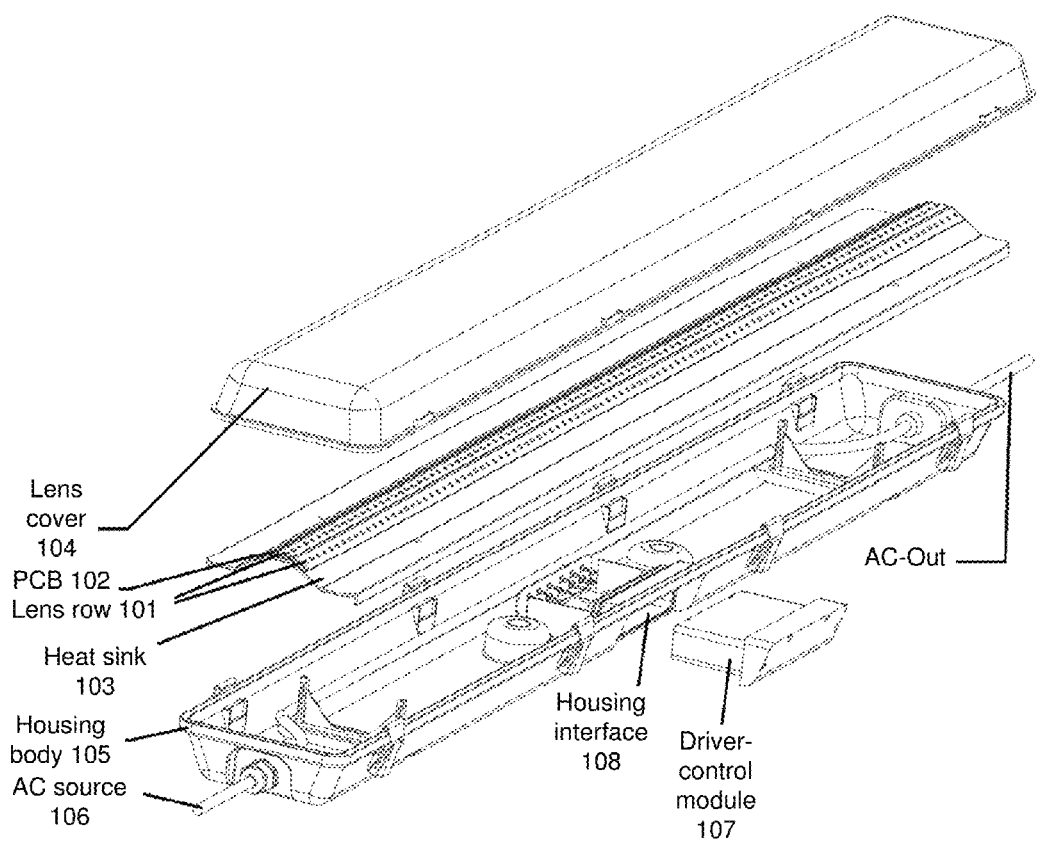
FIG. 1 schematically depicts an embodiment of the present disclosure.

FIG. 1 illustrates one non-limiting embodiment of the present invention. The driver-less LED lighting device comprises of three rows of LED 101, the PCB boards 102 supporting the LED, a heat sink 103, a lens over 104, a housing body 105, a AC source 106, a driver-control module 107, and a housing interface 108 for the driver-control module 107. The AC source 106 comes in through one end of the housing body 105, passes though the housing body, and goes out through the other end of the housing body for supplying the AC to the next LED lighting device. The driver-control module 107 comprises multiple AC-in ports and multiple DC-out ports. The housing interface 108 on the driver-less LED lighting device passes the AC from the AC source to the AC-in ports on the driver-control module 107, and it also receives the DC from the DC-out ports on the driver-control module 107 to power the LED 101 in the driver-less LED lighting device. In this embodiment, the housing interface 108 takes the form of a concave slot, and the main body of the driver-control module can slide into the housing interface slot. The AC-in and the DC-out ports are on the same flat surface of the main body of the driver-control module. When the driver-module module 107 is fastened onto the driver-less LED lighting device through the housing interface 108 by, in this case, screws, the said flat surface makes complete contact to the housing interface, and furthermore, the driver-control module becomes an integral part of the LED lighting device.

Figure 2:
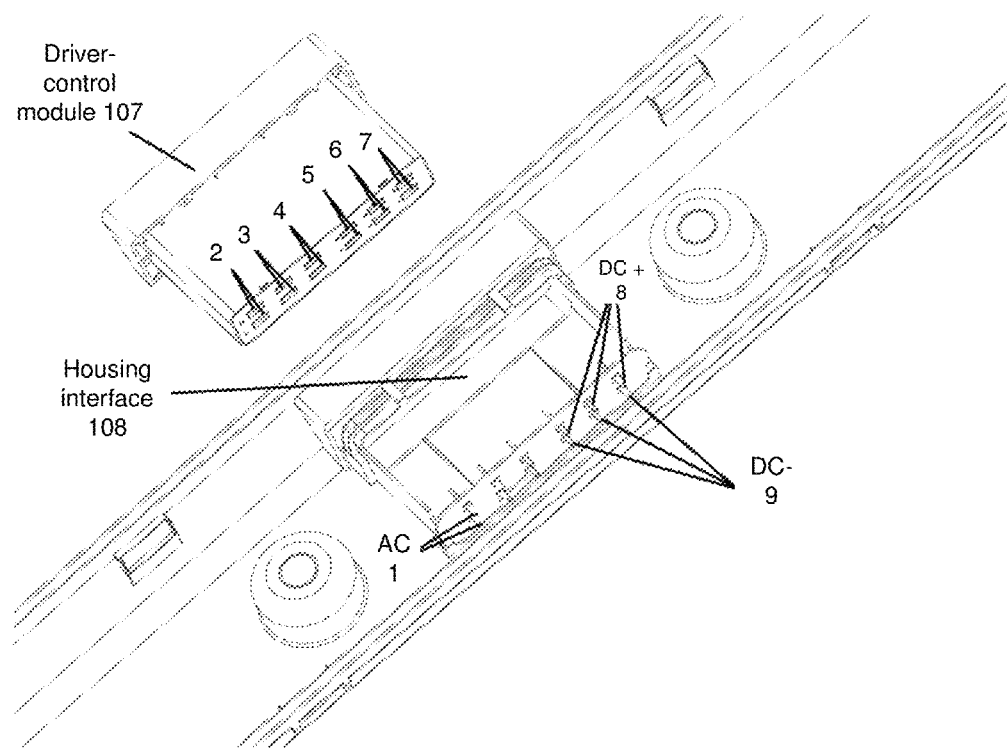
FIG. 2 schematically depicts the first embodiment of the present disclosure from another angle.

FIG. 2 illustrates the first embodiment of the present invention from another angle. It shows in the concave housing interface 108, there is AC source 1 that will make contact to the three AC-in ports 2, 3, 4 on the driver-control module 107 when the driver-control module 107 is slide into the housing interface 108. Three DC-out ports 5, 6. 7 on the driver-control module 107 provides DC back to the driver-less LED lighting device through the matching DC ports 8 and 9 where 8 is the positive DC ports and 9 is the negative DC ports. Each of the three DC-out ports 5, 6, 7 provides the DC electricity to drive one array of LED 101 in the driver-less LED Lighting device as shown in FIG. 1.

Figure 3:
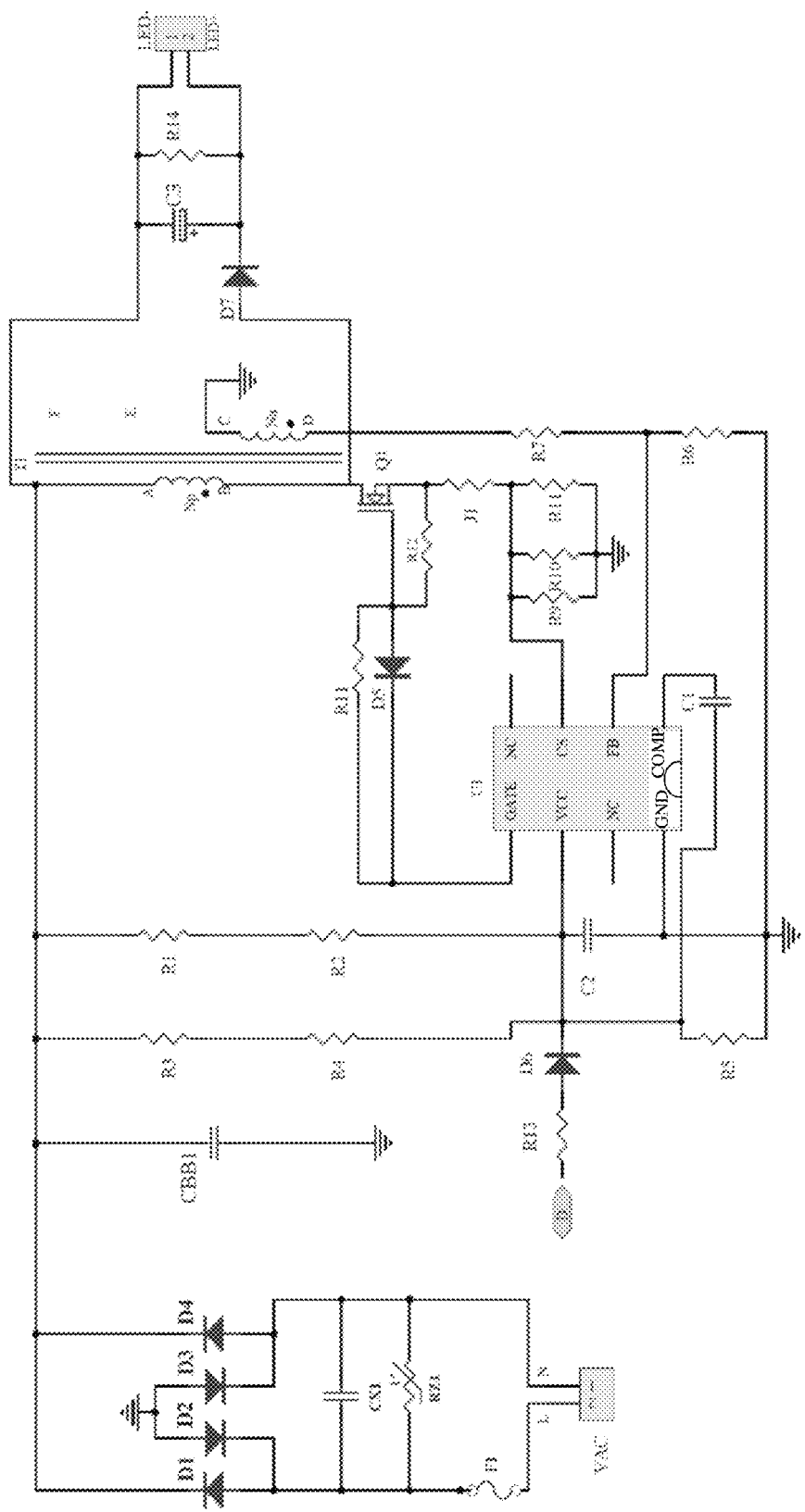
FIG. 3 schematically depicts the basic driver circuit diagram of the first embodiment of the present disclosure.

FIG. 3 illustrates a circuitry embodiment of the driver-control module for the first embodiment of the present invention and relates to the driver of one AC-in port and one DC-out port shown in FIG. 2 and thus for powering one of the three LED arrays 101 shown in FIG. 1. This driver circuitry provides the AC-to-DC conversion and addition electrical components necessary to regulating the DC to drive the LED. The VAC shown in FIG. 3 can be any of the three AC-in ports 2, 3, 4 shown in FIG. 2. The LED+ and LED- shown in FIG. 3 can be any of three DC-out ports 5, 6, 7 shown in FIG. 2.

Figure 4:
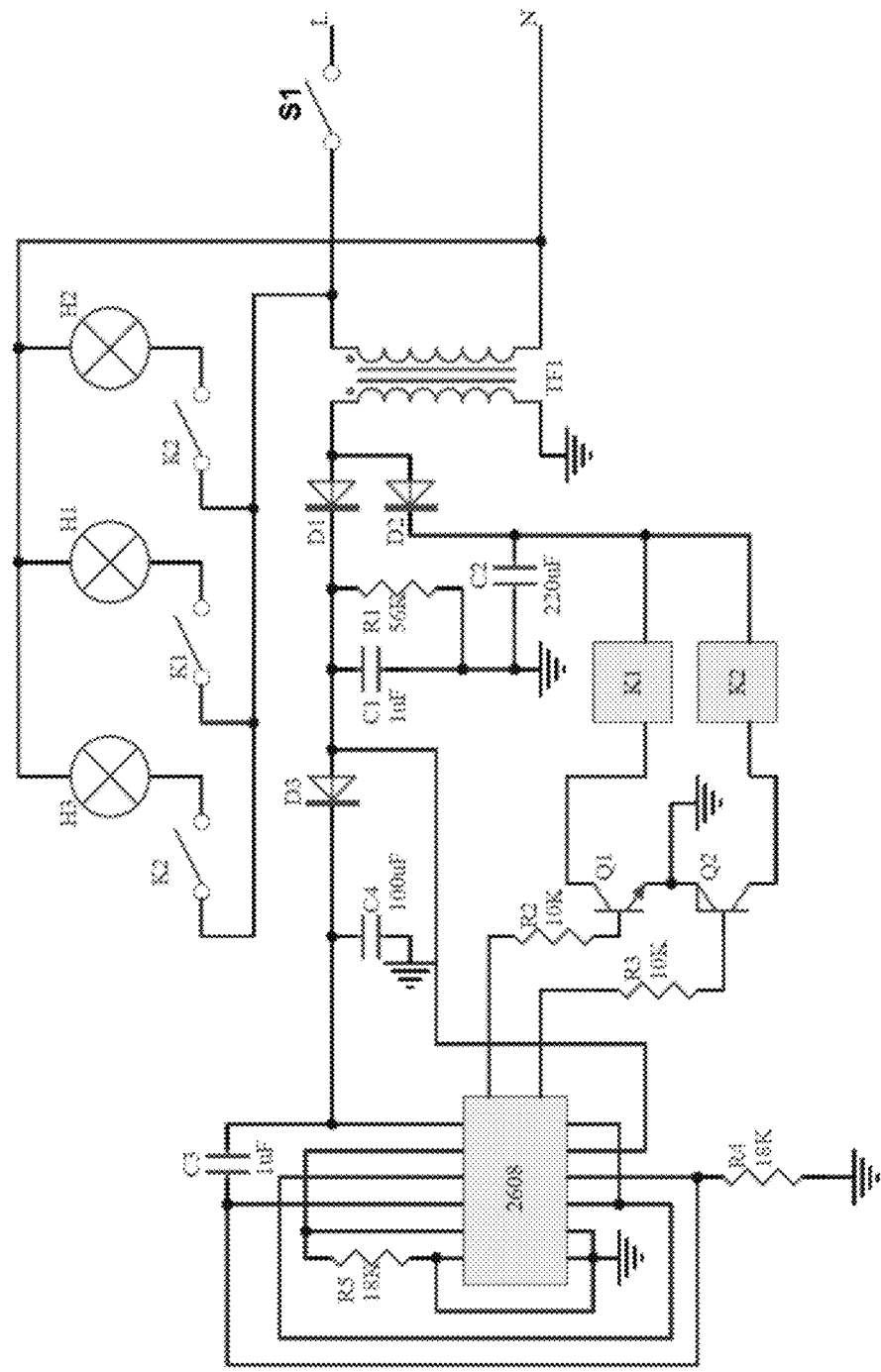
FIG. 4 schematically depicts the step-dimming control circuit diagram of the first embodiment of the present disclosure.

FIG. 4 illustrates an embodiment of the step-dimming control module for the first embodiment of the present invention. H1, H2, H3 each represents one AC-to-DC driver as shown in FIG. 3. More specifically, H1 represents the driver that connects to DC-out port 5 shown in FIG. 2, which powers the center LED array shown in FIG. 1. H2 represents the driver that connects to DC-out port 6 shown in FIG. 2, which powers one side LED array shown in FIG. 1. H3 represents the driver that connects to DC-out port 7 shown in FIG. 2, which power the other side LED array shown in FIG. 1. The control circuit in FIG. 4 includes a pulse-trigger control IC 2608. When the AC switch S1 is turned on the first time, the pulse-trigger control IC activates the relay K1 and deactivates the relay K2, thus connecting AC to the driver H1, subsequently powering up the central LED array shown in FIG. 1, producing ⅓ lighting output for the LED light device. When the AC switch S1 is turned on the second time, the pulse-trigger control IC deactivates the relay K1 and activates the relay K2, thus connecting AC to drivers H2 and H3, subsequently powering the two side LED arrays shown in FIG. 1, producing ⅔ lighting output for the LED lighting device. When the AC switch S1 is turned on the third time, the pulse-trigger control IC activates both relay K1 and K2, thus connecting AC to drivers H1, H2 and H3, subsequently powering all three LED arrays 101 shown in FIG. 1, producing 100% lighting output for the LED lighting device.

Figure 5:
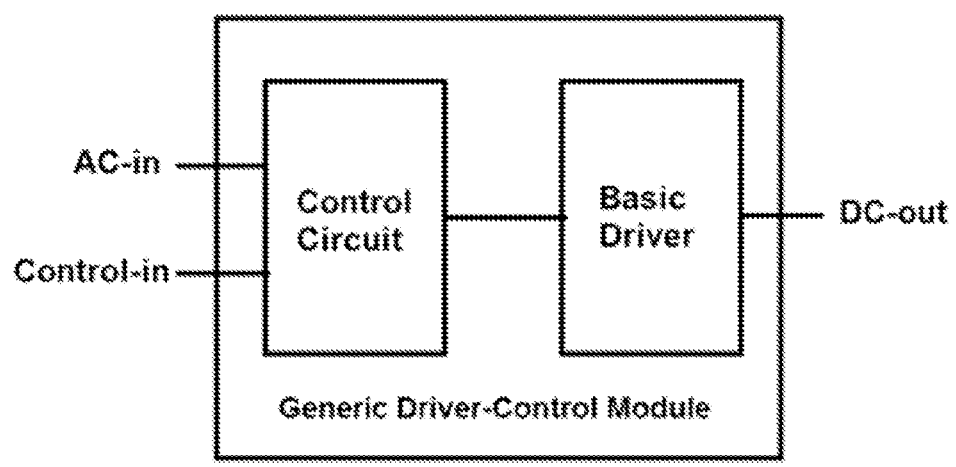
FIG. 5 schematically depicts another embodiment of the driver-control module.

When a driver-control module includes only the circuity shown in FIG. 3, it provides the basic driver function. When a driver-control module include the basic driver circuit in FIG. 3 and the step-dimming control circuit in FIG. 4, the driver-control module becomes a step-dimmable driver. Both the basic driver embodiment and the step-dimmable driver embodiment use the same form factor and the same electrical interface as shown in FIG. 2. This gives the end user the flexibility of upgrading the functionality of the LED lighting device by replacing the basic driver with a step-dimmable driver, without upgrading the entire LED lighting device shown in FIG. 1. Similarly, different control circuit can be disposed between the AC-in port and the basic driver to add new control functionality to the driver-control module while using the same electrical interface between the driver-less LED lighting device and the driver-control module 107. Such generic driver-control module is shown in FIG. 5. For example, a TRIAC based dimmer circuit may be used in lieu of the step-dimmer circuit shown in FIG. 4. If control signal is transmitted via a control signal line, then the driver-control module will have a control-in port as shown in FIG. 5.

In other embodiments of the present invention, the control circuit in the driver-control module may include an infra-red receiver, a WiFi receiver, a Bluetooth receiver, a power-line-transmitted signal receiver, or a receiver controlled via a control signal line, thus enabling the control of the driver-control module via this control signal receiver and controlling the basic driver in the driver-control module.

In other embodiments of the present invention, the control circuit in the driver-control module may include a motion sensor, sound sensor, ambient light sensor, and the combination thereof. The motion sensor activates the basic driver when motion is detected. The sound sensor activates the basic driver when sound is detected. The ambient light sensor activates the basic driver when the ambient light level drops below a preset threshold. The higher the ambient light level, the lower the output level of the basic driver. The lower the ambient light level, the higher the output level of the basic driver.

Figure 6:
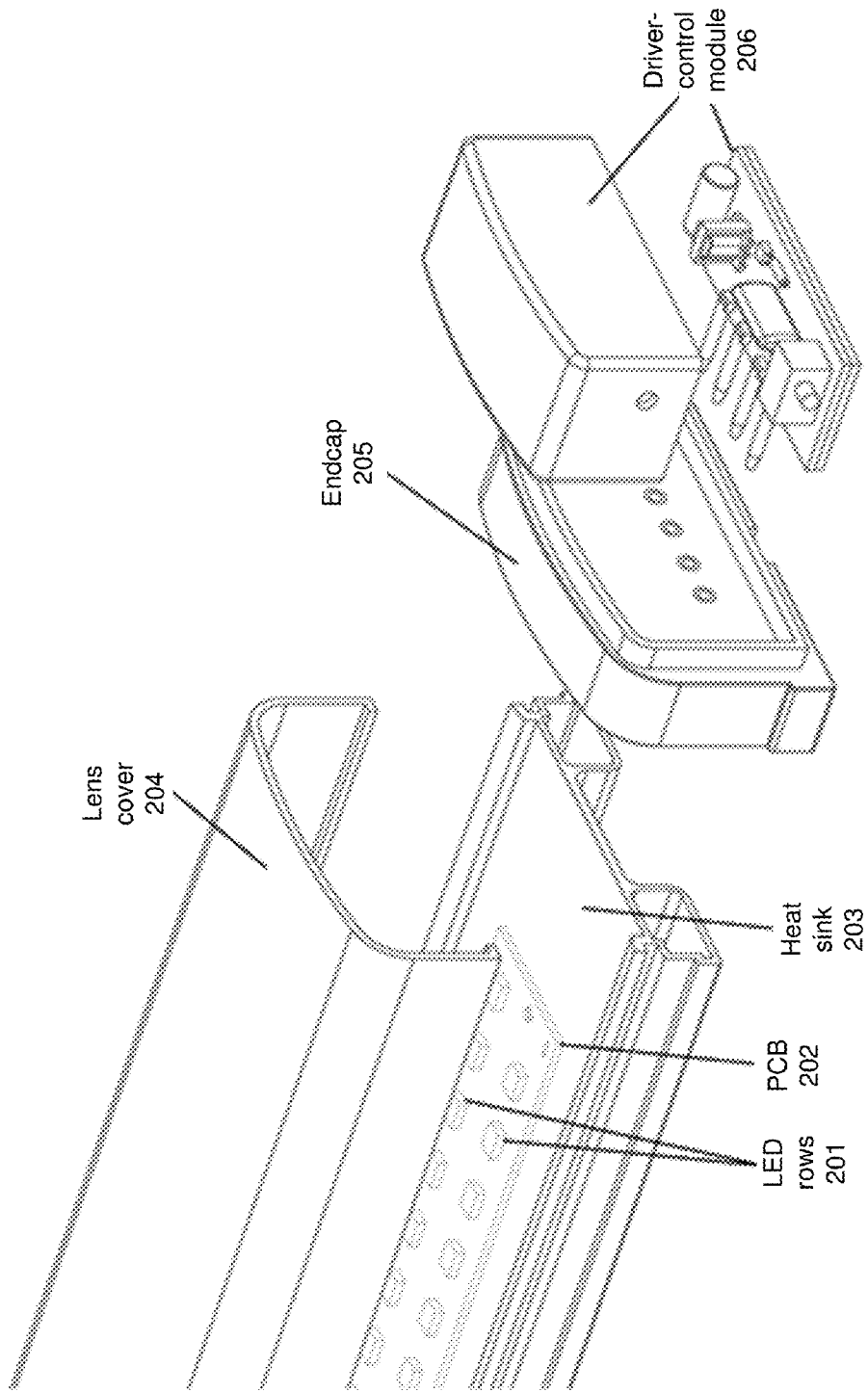
FIG. 6 schematically depicts another embodiment of the present disclosure.
Figure 7:
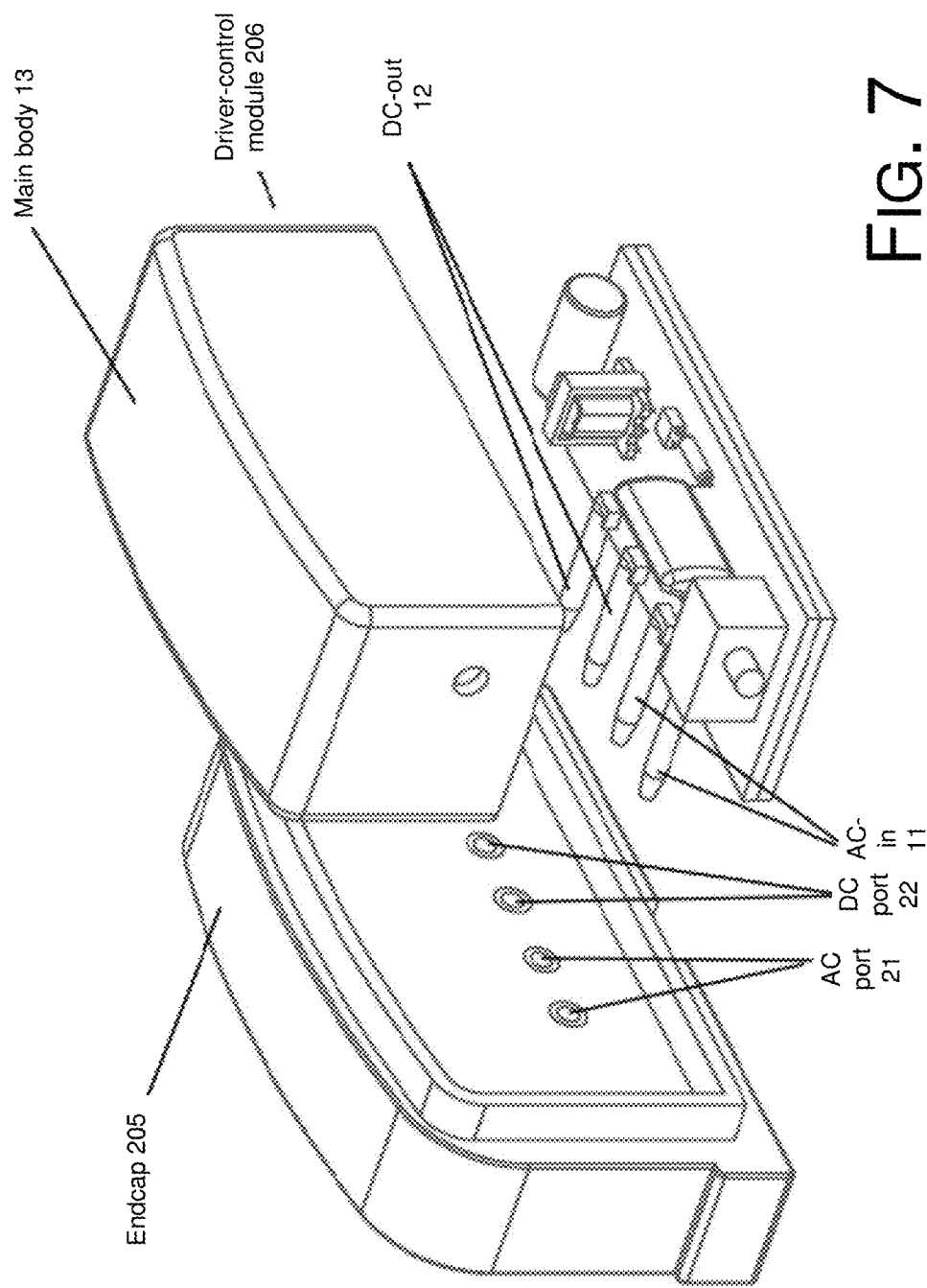
FIG. 7 schematically depicts the housing interface and the driver-control module of the third embodiment of the present disclosure.
Figure 8:
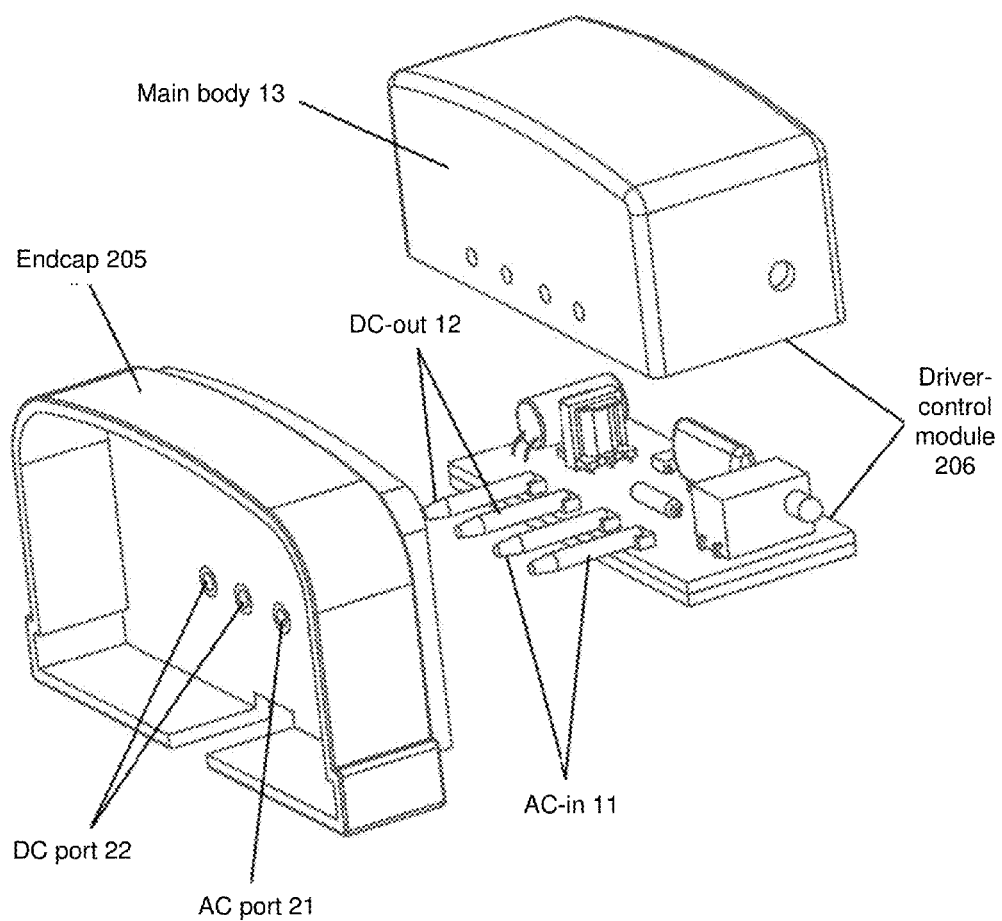
FIG. 8 schematically depicts the housing interface and the driver-control module of the third embodiment of the present invention from another angle.

FIG. 6 illustrates another embodiment of the present invention. The driver-less LED lighting device comprises multiple arrays of LED 201, a PCB board 202 supporting the LED, a heat sink 203 which also serves as the housing of the lighting device, a lens cover 204, and two endcaps 205 for holding the lens cover and the heat sink together. One endcap 205 also serves as the housing interface to the driver-control module 206. FIG. 7 highlights the housing interface 205 and the driver-control module 206 of this embodiment of the present invention, and FIG. 8 depicts the housing interface 205 and the driver-control module 206 of this embodiment from another angle. The AC port 21 connects to the external AC source in a way similar to the AC source port 1 in FIG. 2, so the actual connection of the AC port 21 to the external AC source is not repeated in FIGS. 7 and 8. The DC port 22 connects to the PCB board of the driver-less LED lighting device in a way similar to the DC ports 8, 9 in FIG. 2, so the actual connection of the DC port 22 to the PCB board is not repeated in FIGS. 7 and 8.

In FIG. 7 and FIG. 8, the driver-control module comprises a main body 13, and AC-to-DC converter and additional electrical components necessary to supply DC to drive the LED in the driver-less LED lighting device, and AC-in port 11 and DC-out port 12, with all ports aligned in one row; the main body 13 is made of insulating material.

Figure 9:
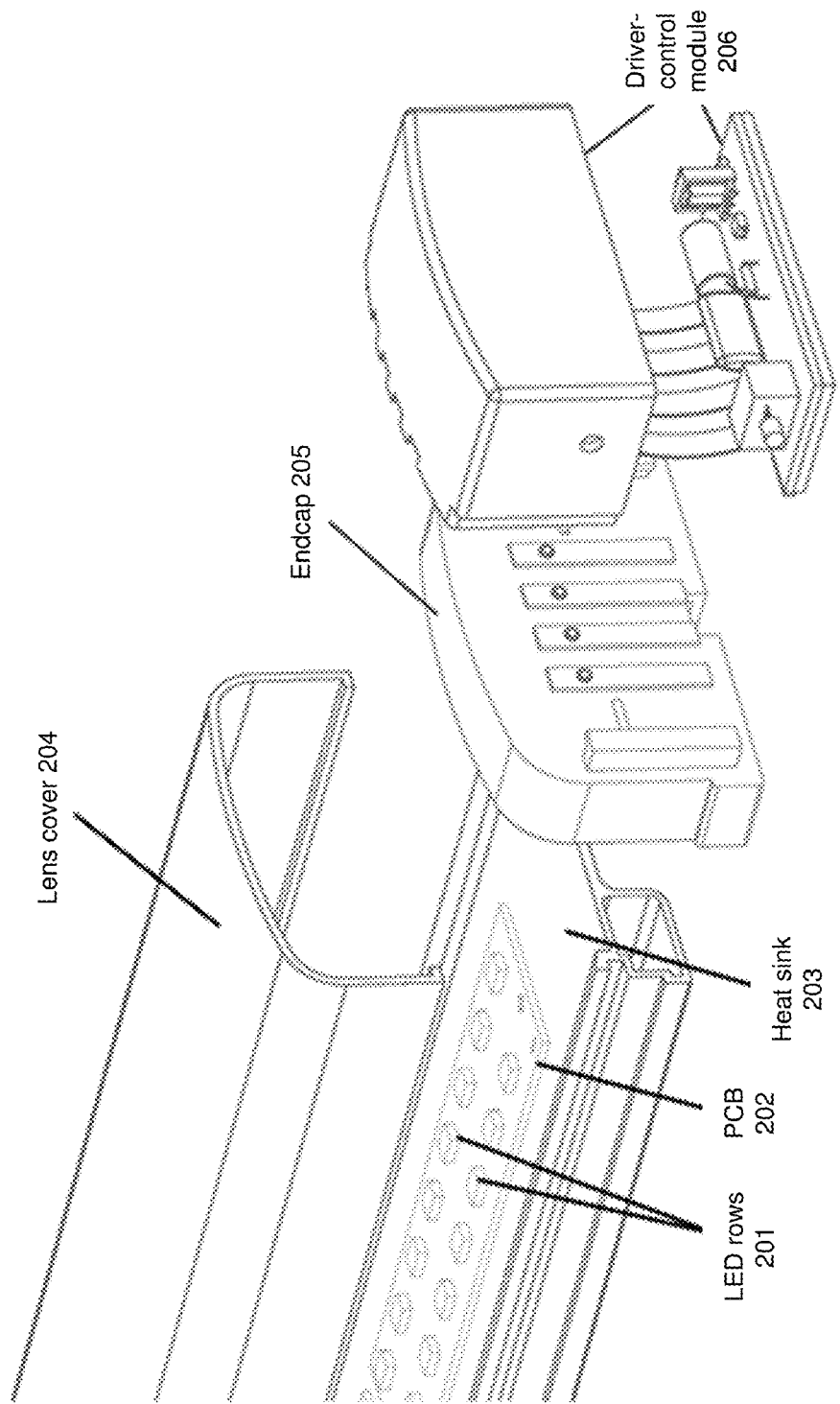
FIG. 9 schematically depicts another embodiment of the present disclosure.
Figure 10:
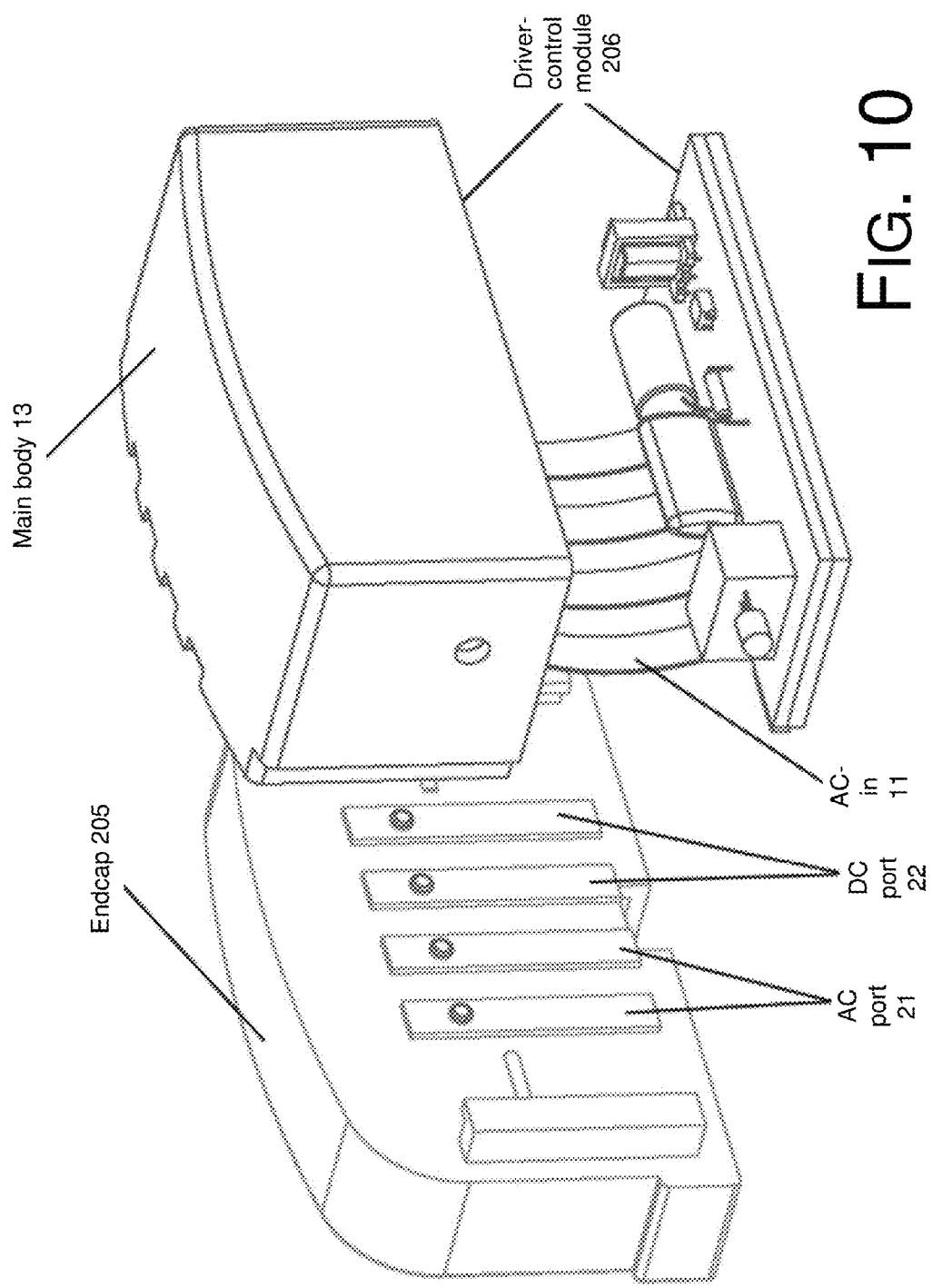
FIG. 10 schematically depicts the housing interface and the driver-control module of the fourth embodiment of the present disclosure.
Figure 11:
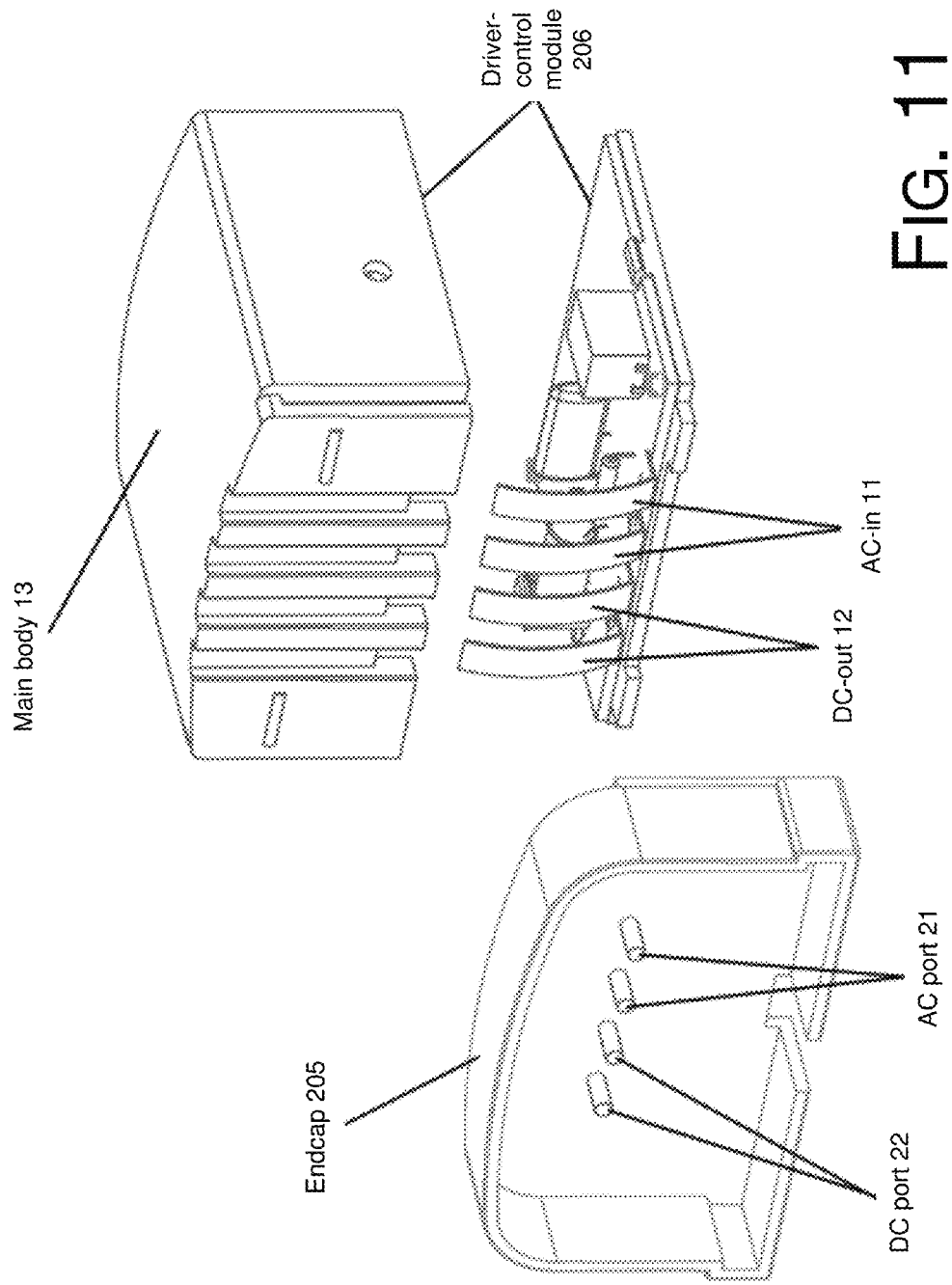
FIG. 11 schematically depicts the housing interface and the driver-control module of the fourth embodiment of the present invention from another angle.

FIG. 9 illustrates another embodiment of the present invention. It is similar to the embodiment discussed above in FIG. 6, but differs in the housing interface design 205. As shown in FIGS. 10 and 11, in this embodiment, the AC-in port 11 and the DC-out port 12 consist of elastic metal plate, the matching ports 21 and 22 on the housing interface consist of flat metal plate. The AC port 21 connects to the external AC source in a way similar to the AC source port 1 in FIG. 2, though the actual connection of the AC port 21 to the external AC source is not shown in FIGS. 10 and 11. The DC port 22 connects to the PCB board of the driver-less LED lighting device in a way similar to the DC ports 8, 9 in FIG. 2, though the actual connection of the DC port 22 to the PCB board is not shown in FIGS. 10 and 11.

Figure 12:
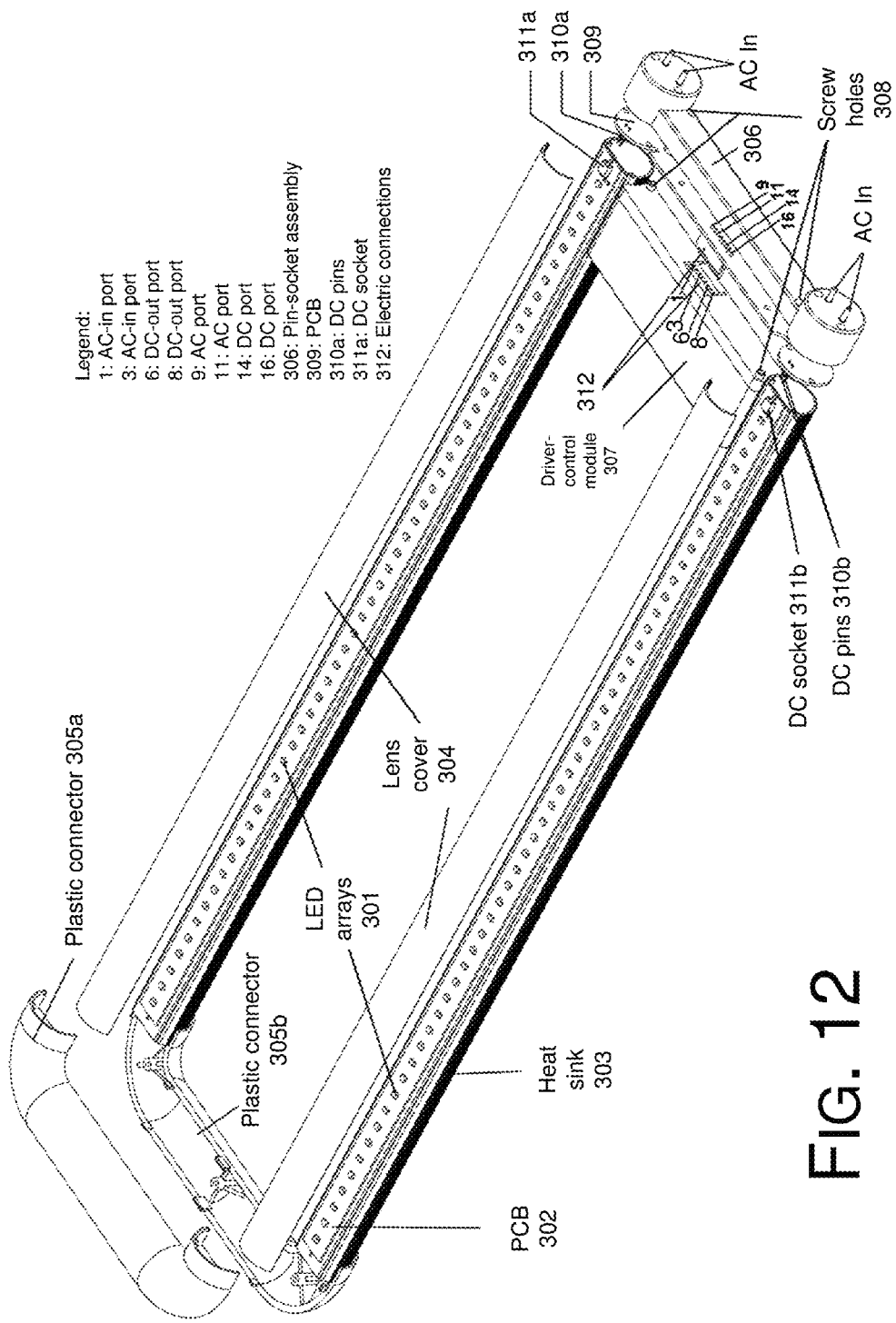
FIG. 12 schematically depicts another embodiment of the present disclosure.

FIG. 12 illustrates another embodiment of the present invention. In this embodiment, the driver-less LED lighting device is a U-shape LED tube. The two LED arrays 301 each is on one of the two prongs. Each LED array 301 in on a PCB board 302, which itself in on top of the heat-sink 303 which also functions as a housing to the prong. Each prong also has a lens cover 304. There is one U-shape plastic connector 305*a* (top) and 305*b* (bottom) on one end to connect two prongs. There is a pin-socket assembly 306 that has two pairs of G13 bi-pin for inserting into the G-13 socket of a U-shape tube fixture. The pin-socket assembly 306 also contains a PCB board 309 which in turn contains two pair of DC pins 310*a*, 310*b*, connecting into the DC sockets 311*a*, 311*b*, on the PCB boards 302 that support the LED arrays 301. The pin-socket assembly 306 also provides the mechanical support for connecting the two prongs of the U-shape tube on the other end. The driver-control module 307 takes the form a flat rectangle block. The electric connection between the driver-control module 307 and the pin-socket assembly 306 is designated as 312, which includes the AC-in ports 1, 3 and the DC-out ports 6, 8 on the driver-control module 307, and the matching AC ports 9, 11 and DC ports 14, 16 on the PCB board 309. The driver-control module 307 provides the basic AC-to-DC conversion function such that it receives AC from the pin-socket assembly 306 and provide DC to the pin-socket assembly, thus powering the LED 301 on the U-shape tube. The pin-socket assembly 306 and the two prongs of the U-shape tube form a housing interface for housing the driver-control module 307. For installation, the driver-control module 307 is first slide into the pin-socket assembly 306, with its AC-in and DC-out ports facing the pin-socket assembly 306. The driver-control module 307 is fastened onto the pin-socket assembly by tightening the screws through the two screw holes 308. Once fastened, the flat surface of the AC-in and the DC-out ports of the driver-control module 307 makes complete contact to the pin-socket assembly 306, and the driver-control module becomes an integral part of the U-shape LED tube. The driver circuit design of this driver-control module is similar to the basic driver illustrated in FIG. 3.

In view of the above, select features of embodiments of the present disclosure are provided below.

An LED lighting device with a replaceable driver-control module interface in accordance with the present disclosure may include a driver-less LED lighting device, a driver-control module, and a housing interface on the driver-less lighting device. The driver-less LED lighting device may include a plurality of LED diodes, at least one PCB board supporting the LED diodes, at least one lens cover, at least one heat sink, and a housing interface configured to house and connect to the driver-control module. The driver-control module may include a main body, an AC-to-DC converter, an AC-in port, and a DC-out port. The driver-less LED lighting device may be configured to receive an AC electrical power from an external AC source and provide the AC electrical power to the AC-in port of the driver-control module. The AC-to-DC converter of the driver-control module may be configured to convert the AC electrical power to a DC electrical power and provide the DC electrical power through the DC-out port to the driver-less LED lighting device. The housing interface of the driver-less LED lighting device may be configured to provide electrical contacts such that the driver-control module receives the AC electrical power from the driver-less LED lighting device, and that the driver-less LED lighting device receives the DC electrical power from the control-driver module. The AC-in port and the DC-out port may be disposed on a primary surface of the main body of the driver-control module. The primary surface of the main body of the driver-control module may make complete contact to the housing interface of the driver-less LED lighting device when the driver-control module is fastened onto to the driver-less LED lighting device.

In some implementations, the AC-in port and the DC-out port on the driver-control module may include cylindrical pins. The housing interface may include match ports that are hole-shaped sockets. The cylindrical pins may be inserted into the hole-shaped sockets.

In some implementations, the AC-in port and the DC-out port on the driver-control module may include elastic metal plates. The housing interface may include matching ports that are flat metal plates. The elastic metal plates and the flat metal plates may be connected when the driver-control module is fastened to the driver-less LED lighting device through the housing interface.

In some implementations, the driver-control module may further include a control circuit, disposed between the AC-to-DC converter and the AC-in and DC-out ports, configured to receive control signals comprising at least an on-off signal, a dimming signal, and a color tuning signal.

In some implementations, the driver-control module may further include a control circuit, disposed between the AC-to-DC converter and the AC-in and DC-out ports, configured to receive the control signals through infra-red signals, WiFi signals, Bluetooth signals, power-line-transmitted signals, a control signal line, or a combination thereof.

In some implementations, the driver-control module may further include a motion sensor, disposed between the AC-to-DC converter and the AC-in and DC-out ports, configured to activate a DC-out level of the DC electrical power responsive to detection of a motion.

In some implementations, the driver-control module may further include a sound sensor, disposed between the AC-to-DC converter and the AC-in and DC-out ports, configured to activate a DC-out level of the DC electrical power responsive to detection of a sound.

In some implementations, the driver-control module may further include a dimmer circuit, disposed between the AC-to-DC converter and the AC-in and DC-out ports, configured to adjust a DC-out level of the DC electrical power according to a dimming signal.

In some implementations, the driver-control module may further include an ambient light sensor, disposed between the AC-to-DC converter and the AC-in and DC-out ports, configured to control a DC-out level of the DC electrical power automatically according to an ambient light level.

In some implementations, the driver-less LED lighting device may include a U-shape LED tube with two prongs. Each of the two prongs may respectively include one LED array, one PCB supporting the LED array, one heat-sink and housing, and one lens cover. The driver-less LED lighting device may further include a U-shape connector, configured to provide mechanical connection for the two prongs on one end, and a pin-socket assembly, configured to provide mechanical connection for the two prongs on an opposite end. The pin-socket assembly may include two sets of pin configured to insert into an external fixture socket to receive the AC electrical power from the external AC source. The pin-stock assembly may be configured to function as the driver-control module to forward the AC electrical power to and receive the DC electrical power from the driver-control module. The driver-control module may take a shape of a flat rectangle block. The driver-control module may be inserted between the two prongs of the U-shape LED tube and may be fastened onto a flat surface of the pin-socket assembly on one of one or more long and narrow surfaces of the pin-socket assembly.

In some implementations, the driver-control module may further include a control-signal-in port.

In some implementations, the driver-control module may receive a control signal from the driver-less LED lighting device.

The housing interface on the lighting device houses the driver-control module such that, when the driver-control module is fastened to the driver-less lighting device through the housing interface, the driver-control becomes an integral part of the lighting device. Moreover, the housing interface provides electrical contacts for the driver-control module to receive AC from the driver-less lighting device and for the driver-less lighting device to receive DC from the control-driver module. Furthermore, the housing interface provides a mechanical mechanism for fastening the driver-control module onto the driver-less lighting device.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

For the purposes of this disclosure and the claims that follow, the terms "coupled" and "connected" may have been used to describe how various elements interface. Such described interfacing of various elements may be either direct or indirect.

What is claimed is:

1. A light-emitting diode (LED) lighting device with a replaceable driver-control module interface, comprising:
    a driver-less LED lighting device;
    a driver-control module; and
    a housing interface on the driver-less lighting device, wherein:
        the driver-less LED lighting device comprises a plurality of LED diodes, at least one PCB board supporting the LED diodes, at least one lens cover, at least one heat sink, and a housing interface configured to house and connect to the driver-control module;
        the driver-control module comprises a main body, an AC-to-DC converter, an AC-in port, and a DC-out port;
        the driver-less LED lighting device is configured to receive an AC electrical power from an external AC source and provide the AC electrical power to the AC-in port of the driver-control module;
        the AC-to-DC converter of the driver-control module is configured to convert the AC electrical power to a DC electrical power and provide the DC electrical power through the DC-out port to the driver-less LED lighting device;
        the housing interface of the driver-less LED lighting device is configured to provide electrical contacts such that the driver-control module receives the AC electrical power from the driver-less LED lighting device, and that the driver-less LED lighting device receives the DC electrical power from the control-driver module;
        the AC-in port and the DC-out port are disposed on a primary surface of the main body of the driver-control module; and
        the primary surface of the main body of the driver-control module makes complete contact to the housing interface of the driver-less LED lighting device when the driver-control module is fastened onto to the driver-less LED lighting device.

2. The LED lighting device of claim 1, wherein the AC-in port and the DC-out port on the driver-control module comprise cylindrical pins, wherein the housing interface comprise match ports that are hole-shaped sockets, and wherein the cylindrical pins are inserted into the hole-shaped sockets.

3. The LED lighting device of claim 1, wherein the AC-in port and the DC-out port on the driver-control module comprise elastic metal plates, wherein the housing interface comprise matching ports that are flat metal plates, and wherein the elastic metal plates and the flat metal plates are connected when the driver-control module is fastened to the driver-less LED lighting device through the housing interface.

4. The LED lighting device of claim 1, wherein the driver-control module further comprises a control circuit, disposed between the AC-to-DC converter and the AC-in and DC-out ports, configured to receive control signals comprising at least an on-off signal, a dimming signal, and a color tuning signal.

5. The LED lighting device of claim 1, wherein the driver-control module further comprises a control circuit, disposed between the AC-to-DC converter and the AC-in and DC-out ports, configured to receive the control signals through infrared signals, WiFi signals, Bluetooth signals, power-line-transmitted signals, a control signal line, or a combination thereof.

6. The LED lighting device of claim 1, wherein the driver-control module further comprises a motion sensor, disposed between the AC-to-DC converter and the AC-in and DC-out ports, configured to activate a DC-out level of the DC electrical power responsive to detection of a motion.

7. The LED lighting device of claim 1, wherein the driver-control module further comprises a sound sensor, disposed between the AC-to-DC converter and the AC-in and DC-out ports, configured to activate a DC-out level of the DC electrical power responsive to detection of a sound.

8. The LED lighting device of claim 1, wherein the driver-control module further comprises a dimmer circuit, disposed between the AC-to-DC converter and the AC-in and DC-out ports, configured to adjust a DC-out level of the DC electrical power according to a dimming signal.

9. The LED lighting device of claim 1, wherein the driver-control module further comprises an ambient light sensor, disposed between the AC-to-DC converter and the AC-in and DC-out ports, configured to control a DC-out level of the DC electrical power automatically according to an ambient light level.

10. The LED lighting device of claim 1, wherein the driver-less LED lighting device comprises a U-shape LED tube with two prongs, wherein each of the two prongs respectively comprises one LED array, one PCB supporting the LED array, one heat-sink and housing, and one lens cover, wherein the driver-less LED lighting device further comprises a U-shape connector, configured to provide mechanical connection for the two prongs on one end, and a pin-socket assembly, configured to provide mechanical connection for the two prongs on an opposite end, wherein the pin-socket assembly comprises two sets of pin configured to insert into an external fixture socket to receive the AC electrical power from the external AC source, wherein the pin-stock assembly is configured to function as the driver-control module to forward the AC electrical power to and receive the DC electrical power from the driver-control module, wherein the driver-control module takes a shape of a flat rectangle block, and wherein the driver-control module is inserted between the two prongs of the U-shape LED tube and is fastened onto a flat surface of the pin-socket assembly on one of one or more long and narrow surfaces of the pin-socket assembly.

11. The LED lighting device of claim 1, wherein the driver-control module further comprises a control-signal-in port.

12. The LED lighting device of claim 1, wherein the driver-control module receives a control signal from the driver-less LED lighting device.

* * * * *